United States Patent Office 3,017,381
Patented Jan. 16, 1962

3,017,381
HEAT RESISTANT POLYESTER OF A DICARBOX-YLIC ACID, A POLYHYDRIC ALCOHOL, AND A S-TRIAZINE HAVING AT LEAST TWO N-ALKEN-YLOXY GROUPS AND REACTION PRODUCT OF ETHYLENICALLY UNSATURATED MONOMER THEREWITH
John C. Schlegel, Jr., Peekskill, N.Y., assignor to American Cyanamid Company, New York, N.Y., a corporation of Maine
No Drawing. Filed Apr. 30, 1959, Ser. No. 809,900
20 Claims. (Cl. 260—45.4)

This invention relates to improved resinous compositions. More particularly, this invention relates to essentially linear polyester resins containing random linking nuclei derived from substituted s-triazine compounds. This invention, in narrower aspects, further concerns polymerizable polyester resinous compositions comprising a polyester resin obtained by esterifying an alpha, beta ethylenically unsaturated dicarboxylic acid, an alkane diol and a s-triazine compound containing at least two alkenyloxy substituents in admixture with a monomeric material having a $CH_2=CH<$ group, and to the improved heat-resistant resin products derived by curing said admixtures at elevated temperatures.

Polyester resinous compositions, that is, mixtures of an unsaturated reactive polyester resin and a cross-linking monomeric component, are well known in the art and are extensively used in the surface coating, casting and laminating fields. They are particularly useful in fabricating reinforced plastic products, more specifically laminates. Laminates are conventionally prepared by impregnating cloths, usually glass fiber cloths or matts, with the polyester resinous composition, and thereupon consolidating under heat and pressure a superimposed assembly of a plurality of the impregnated cloths. In the consolidation process copolymerization is effected between the reactive resin and monomer of the resinous composition. Accordingly, the polyester resinous composition is converted to a substantially insoluble and infusible state and the individual impregnated laminae are cohesively if not integrally united into a unitary structure.

The laminate structures prepared in this manner are used for a variety of purposes. They are utilized as structural and especially decorative members in building construction. Another application representing an important use of laminates derived from polyester resinous compositions is strictly industrial in nature. In this type of application the laminates are used as electrical switch-board panels, gears, and component parts of appliances and other articles. The recent years have seen the extensive use of these materials in electronic devices such as televisions, radios, computers, and the like, wherein they are employed as mountings or in some instances as bases for printed circuits. A particular specialized application of these laminates has been in the aeronautical field where they are used to a considerable extent in radomes for aircraft and as component parts of the electronic devices in such assemblies.

In electronic gear, particularly that of the modern aircraft, the laminates are exposed to relatively high temperatures for considerable periods of time. Prolonged exposure to high temperatures is known to induce a deleterious degradation in the resinous component of the laminate. The result of the ensuing degradation is manifested in the loss of mechanical structure properties. Loss of structural strength properties is regarded to be quite objectionable. Additionally, exposure to high temperatures adversely affects the electrical properties of the laminate component. This can have serious consequences when the laminate is used in electrical or electronic devices. As stated previously, all of the known polyester resinous compositions are prone to degrade in the manner mentioned upon prolonged exposure to elevated temperatures. However, there have been considerable strides made in developing special polyester resinous compositions which show a particular degree of resistance to degrade physically at elevated temperatures. These polyester resinous compositions are generally called heat-resistant resins in the art.

The most successful heat-resistant polyester resinous compositions are at present prepared by employing as a material copolymerizable with the reactive resin component of the polyester composition a compound containing the triazine structure. While a cross-linking agent containing the triazine structure contributes immeasurably to the heat-resistant properties of the copolymerization product, other important factors relating to the nature of the reactive resin and the curing cycle employed must be observed in order to attain optimum heat-resistant properties. More will be said on this aspect later.

The triazine structure is conventionally incorporated into the resinous structure of the heat-resistant variety by the employment of monomeric cross-linking agents such as the alkenyloxy derivatives of 1,3,5-triazine. A wide variety of this type of ester and the use thereof in copolymerizing with an alpha, beta ethylenically unsaturated polyester or reactive resin are disclosed in Patent No. 2,510,503. There are a number of adverse factors residing in the use of the triazine base esters as set forth in the aforesaid patent for the purpose of attaining heat-resistant resins. Among such is the extreme exothermic behavior evidenced by these highly unsaturated esters in copolymerizing with the reactive resin. It is known that high curing temperatures are necessarily required to utilize the full cross-linking potential of the unsaturated ester. This required use of high temperatures for curing purposes adds to the inherent exothermic propensities of the polymerizing ester with the net result that inordinate high temperatures may be experienced within the plastic during the curing process necessary to obtain ultimate mechanical strength properties. It is known how to moderate to some extent the exothermic behavior of the polymerizing unsaturated ester and consequently one may fairly readily obtain products which are not charred or show similar deleterious effects. However, a problem which is not as readily solved is that resulting from the stresses and strains set up within the laminate during the necessary cure at the required elevated temperatures. These stresses and strains are manifested by the plastic exhibiting a surface craze condition. Surface crazing of this type is known to facilitate the penetration of moisture within the plastic with a resultant diminution of electrical properties.

Also, in preparing heat-resistant polyester resinous compositions a certain balance is to be maintained as regards the weight relationship between the reactive resin and the monomeric cross-linking agent. In other words, satisfactory formulations are limited to a maximum amount of the unsaturated ester in comparison with the reactive resin and with regard to this consideration the triazine esters do not constitute an exception.

I have discovered how to incorporate the s-triazine ring within a reactive resin structure. Thus, the heat-resistant qualities associated with the triazine configuration may be imparted to the reactive polyester resin itself. These resins can then in turn be used with quantities of the monomeric alkenyloxy triazines as observed in accordance with the best of formulation practices with the net result that the total polyester resinous composition contains a content of s-triazine higher than was hitherto practical.

A considerable emphasis has been placed upon the heat-resistant qualities associated with the s-triazine structure. However, it is to be mentioned that this type structure imparts other desirable characteristics to a resinous composition containing same. The triazine structure is availed of in preparing resinous compositions where excellent chemical and abrasion resistance and light stability characteristics are desired. Melamine-formaldehyde condensates are typical examples of such products exhibiting the ultimate in these properties. Therefore, it can be readily appreciated that my invention may be advantageously used to prepare polyester resins either of the unsaturated or saturated type having improved properties. The unsaturated resins that may be prepared in accordance with the teachings of this invention can be suitably employed by themselves in the absence of a monomeric cross-linking material to yield chemical resistant and light stable products useful for a plurality of purposes. Similarly, saturated linear polyesters may be prepared in accordance with this invention which are particularly useful as resinous plasticizers.

In the practice of this invention the s-triazine configuration is incorporated into a polyester structure merely by esterifying a s-triazine substituted with at least two alkenyloxy substituents in the presence of a polycarboxylic acid and a polyhydric alcohol. In such a procedure an esterification reaction occurs between the polybasic acid and the polyol with a concurrent transesterification reaction taking place between the alkenyloxy substituents of the s-triazine and the polyol existing in the reaction mixture.

It is old in the art to transesterify an alkoxy derivative of an s-triazine with a mono hydroxy compound. However, the procedure advocated for securing a reaction product therefrom is limited to use of low temperatures and additionally other cumbersome aspects are encountered. Also the procedure for transesterifying an alkenyloxy s-triazine with a polyol to obtain a linear resinous material is known. Again, low temperature reaction conditions and the use of transesterification catalysts are considered required in order to achieve suitable products. However, to the best of my knowledge, the incorporation of an s-triazine ring into a polyester backbone much less the accomplishment thereof by merely reacting a polycarboxylic acid and a polyol in the presence of an alkenyloxy s-triazine in a conventional range of esterification temperatures was not known. It was, therefore, surprising to observe that certain substituted s-triazines, that is, those containing at least two alkenyloxy substituents would smoothly and effecively enter into an resinification reaction with a polycarboxylic acid and a polyol without necessary resort to low temperature conditions and the use of special catalysts.

The s-triazine compounds that may be used in practicing my invention are represented by the following formula:

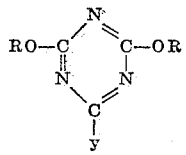

in which R is an alkenyl radical containing not in excess of 4 carbon atoms and Y is either alkenyloxy, alkoxy, alkyl, aralkyl, aryl, or amino radicals. In the above formula R may be the same or combinations of various ethylenically unsaturated radicals. Specific examples of unsaturated radicals contemplated include: allyl, methallyl, 2-butenyl, 3-butenyl, alpha methylvinyl, 1-propenyl, or the like.

The radical Y may be any one of a large number of radicals such as for example, alkenyloxy substituents, e.g., allyloxy, methallyloxy, ethallyloxy, propallyloxy, 2-butenyloxy, 3-butenyloxy, 3 - methyl - 2 - butenyloxy, 3-methyl - 3 - butenyloxy, 2-pentenyloxy, 3-pentenyloxy, 2 - methyl - 3 - pentenyloxy, 2-octenyloxy, 3-nonenyloxy, 2-decenyloxy, etc.; alkoxy radicals are such as methoxy, ethoxy, propoxy, isopropoxy, butoxy, octoxy, and the like. Also Y may be alkyl including straight chain and branch chain radicals containing from 1 to 18 carbon atoms. Y may be an aralkyl such as for example, benzyl and the nuclear substituted derivatives thereof. Also, Y may be aryl such as phenyl or nuclear substituted phenyl and the like. Additionally, Y may be an amino radical or mono or di organo derivatives thereof.

In obtaining the polyester products contemplated, at least two alkenyloxy radicals per triazine molecule must undergo the transesterification reaction. However, if three of such radicals exist, it has been found that all can be reacted and yet a substantially linear resin product is obtained. Oftentimes when employing a triazine containing all ester substituents of the unsaturated variety, it is desirable to carry the condensation to the point when, on the average, only two of the unsaturated groups transesterify. In this way, the polyester product will have greater polymerization potential by virtue of the alkenyloxy content present. Where the purpose is to prepare a plasticizing resin then it is of definite advantage to use a dialkenyloxy compound having the third remaining carbon atom substituted with a saturated radical such as alkyl, aralkyl, aryl, amino, substituted amino, and the like.

The polyesters of this invention containing the triazine ring can be and are preferably prepared by observing conventional reaction procedures employed in manufacturing resinous esterification products. The conventional procedure consists of mixing together the polybasic acid and polyol, and in this instance the triazine ester, and heating the reaction mixture with stirring to elevated temperatures in the range of from about 150° C. to 200° C. Higher temperatures can be employed, if the boiling point characteristics of the reaction components so permit or if means are provided for returning to the reaction medium any reaction component that might be volatilized. In reacting the ingredients mentioned, it can be appreciated that a sizeable portion of the over-all reaction mode is of the straight esterification type. Accordingly, as is known to those skilled in the resin art it is desirable not to employ a temperature substantially lower than about 150° C. in order to achieve reasonable processing cycles. As mentioned previously, it is not necessary to employ a transesterification catalyst in order to react the triazine ester when conducting the reaction, say for instance, in the upper portion of the above-mentioned preferred range. However, in some instances while not mandatory it may nevertheless be advantageous to conduct the reaction at the lower temperatures indicated, for example, from about 140° C. to 165° C. When operating in this comparative low temperature range, the use of a transesterification catalyst might be indicated. Preferred among the transesterification catalysts are the various alkaline metals, more particularly, sodium, potassium, lithium, rubidium, or cesium. It is further preferred that the alcoholates constitute the form of the alkali metal catalyst. Additionally, fatty acid salts of metals like calcium, lead, and aluminum may be used. Specific examples of this type of transesterification catalyst are lead octoate, lead naphthenate, calcium hexoate, calcium nonoate, aluminum isopropionate, etc. Conventional amounts of the catalyst than can be used are based on the metallic constituent of the compound and range from 1.0 mol percent to as high as 10 mol percent of the reaction mixture.

In preparing polyesters in accordance with this invention it is preferable to provide the reaction vessel with means for collecting the unsaturated mono alcohol by-product obtained in the transesterification reaction. Apart from toxicity considerations associated with vapors of such materials it is desirable to keep track of the amount of such by-product distilled in order to follow the extent of the reaction occurring.

In preparing the polyesters contemplated, one may use a variety of polycarboxylic acids. The dicarboxylic acids are preferred irrespective of the ultimate use intended for the resinous esterification product. Where it is intended that the esterification product is to be used as the reactive resin in a polyester resinous composition, the employment of at least a portion of polymerizable unsaturated acids is required. The unsaturated alpha, beta polycarboxylic acids of the aliphatic series are customarily utilized for this purpose. Examples of ethylenically unsaturated polycarboxylic acids of this type include maleic, fumaric, itaconic, aconitic, citraconic, mesaconic and the like. These unsaturated acids should be present in an amount approximating at least 20% by weight of the total weight of polycarboxylic acids used, and preferably, in amounts varying between about 25 and 65% by weight based on the total weight of the polycarboxylic acid component present.

Examples of non-polymerizable polycarboxylic acids that may be used in combination with the ethylenically unsaturated acids mentioned to prepare reactive resins or used exclusively to prepare non-polymerizable polyesters having utility as plasticizing resins include such as phthalic, oxalic, malonic, succinic, glutaric, sebacic, adipic, suberic, azelaic, tricarballylic, citric, tartaric, malic, and the like. Whenever available, the anhydrides of these acids and the alpha, beta-ethylenically unsaturated acids may be used, e.g., maleic anhydride, phthalic anhydride, succinic anhydride, etc. Also mixtures of the acids and/or anhydrides may be used in the preparation of the polyester resin. In some instances all or part of the dibasic acid component may be in the form of di or monoester wherein the alcoholic moiety corresponds to lower monohydric alcohols such as methanol and ethanol.

In the preparation of the polyesters contemplated herein, it is preferred to use a predominate amount of a polyol containing not in excess of two hydroxyl groups. Among the glycols which are suitable are the following: ethylene glycol, diethylene glycol, propylene glycol, dipropylene glycol, triethylene glycol, tetraethylene glycol, butanediol-1,2-butanediol-1,3, butanediol-1,4, pentanediol-1,2, pentanediol-1,4, pentanediol-1,5, hexanediol-1,6, and the like. Sometimes minor amounts of polyhydric alcohols having more than two hydroxyl groups may be employed in combination with a predominant amount of a diol. Examples of polyhydric alcohols which may be used in this manner include glycerol, trimethylol ethane, trimethylol propane, pentaerythritol, dipentaerythritol, sorbitol, xylitol, etc.

The formulation of the polyesters of this invention may be conveniently based upon or related to the mols of the dicarboxylic acid employed. For instance, the reference constituent can be one mol of the dibasic acid. On this basis, from about 0.25 to 2.0 mols of the triazine compound containing at least 2 alkenyloxy substituents may be used. Ordinarily in the preparation polyesters derived from a polycarboxylic acid and a polyol solution, there is usually employed an excess of mol equivalents of hydroxyl groups over the mol equivalents of carboxylic groups contained by the polybasic acid component. This excess is usually in the order of 10% or more. However, in the preparation of the resinous compositions in accordance with this invention it is preferred to observe a substantially stoichiometric relation between the hydroxyl groups of the polyol component and the functional groups (esterifiable or transesterifiable) represented by the acid and triazine ester component. Accordingly, on the basis of 1 mol of a dicarboxylic acid one will use a polyol or combinations thereof representing two mol equivalents of hydroxyl groups. In addition to this amount required to react with the polybasic acid, one must use at least an amount of polyol representing two mol equivalents of hydroxy groups per mol of the triazine ester in the resin mixture. While a substantial stoichiometric relationship between the polyol and the combination of triazine ester and carboxylic acid components is ordinarily suitable, nevertheless, moderate excesses of the polyol may be used The reaction is usually carried out for that period of time necessary for effecting tranesterification of at least two alkenyloxy triazine esters as indicated when two mols of alcohol corresponding to the alcohol moiety of the triazine ester is distilled from the reaction mixture. The course of the reaction in preparing polyesters is normally followed by observing the acid number of the reaction mixture. Generally, the conventional polyesters are esterified until an acid number of less than about 60 is obtained. On the other hand, the acid number of the reaction mixture is not a particularly reliable criterion in preparing the modified compositions of this invention. In other words, in reacting the triazine ester one can secure products which exhibit what is normally regarded as excessively high acid number values and yet these products are wholly suitable in the practice of this invention. Ordinarily, in polyester preparation the acid number of the reaction mixture more or less infallibly characterizes the extent of condensation that has taken place. However, when a triazine ester is present in the reaction mixture, such as practiced in my invention, it has been observed that adequate polymeric lengths are obtained for the resinous products in spite of the fact that the products may exhibit an unusually high acid number value. This can be better understood by considering the following two extreme modes of reaction to which the resinification procedure of this invention is theoretically amenable. These reaction schemes are illustrated using ethylene glycol, maleic acid and triallyl cyanurate as the resinifying reactants.

MODE I

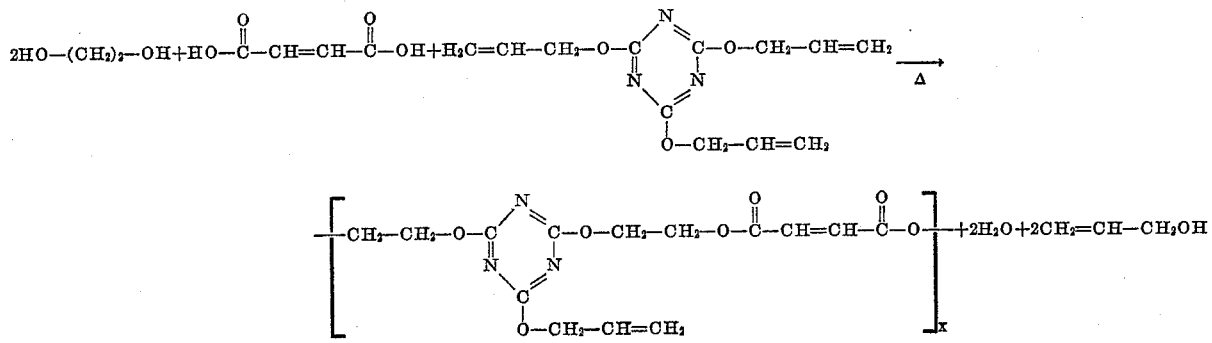

MODE II

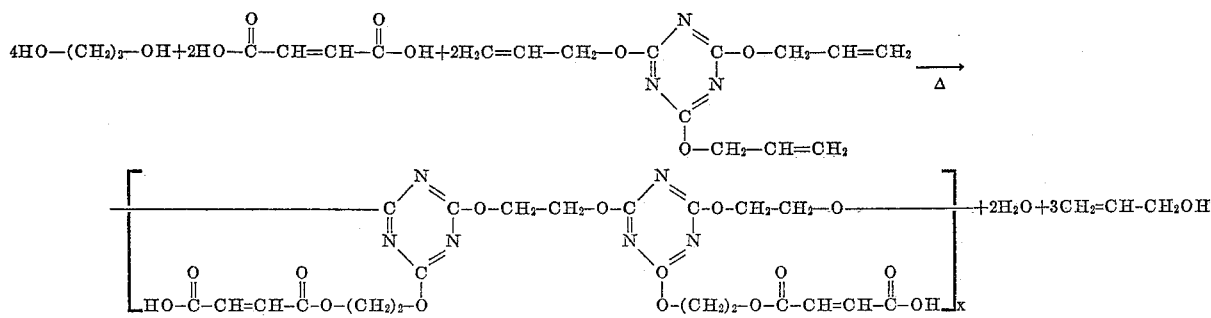

If the reaction goes exclusively along the lines indicated by Mode I then a suitable reaction end point is represented by a polymer having an acid number of about 60 or less. On the other hand, if the reaction goes exclusively according to the scheme indicated in Mode II it can be appreciated that relatively highly condensed polymers will nevertheless exhibit very high acid numbers. Actually in practice, the products obtained appear to be derived from the two reaction schemes proposed. Therefore, suitable reaction products in accordance with this invention will exhibit rather high acid numbers for instance in the order of about 100. Again, it is repeated that the acid number in compositions contemplated herein is not particularly indicative of its polymeric length. I believe that a reaction along the lines proposed in Mode I will be favored by the use of the lower reaction temperatures specified herein. However, the obtaining of reaction products exclusively in the nature of either of the proposed reactions is not practical. If for any reason a product is obtained which is suitable in all respects other than the fact that it has a high acid number, one may easily remedy this. For instance, a condensation product having an undesirable high acid number can be reacted with a monohydric alcohol or other suitable reactants for reducing the acidity of the polymer.

In preparing polyester resinous compositions, the reactive resin containing polymerizable unsaturation is mixed with a vinyl monomer copolymerizable therewith. The broad class of monomeric materials suitable as cross-linking agents comprises a class of compounds containing the $CH_2=CH<$ group and preferably having a boiling point in excess of 60° C. When it is desired to prepare a heat-resistant polyester resinous composition the various unsaturated triazine esters are preferred. These include: triallyl cyanurate, triallyl crotonyl cyanurate, trimethallyl cyanurate, diallylmethallyl cyanurate, dimethallyl cyanurate, diallyl crotonyl cyanurate, diallylmethoxy cyanurate, diallylethoxy cyanurate, and the like. Additionally, one may use isocyanurates corresponding to many of the cyanurates indicated as suitable cross-linking agents for the preparation of heat-resistant resins.

It is contemplated that monomeric cross-linking agents not containing the triazine ring may be used solely as the cross-linking agent or in combination with the cyanurates and isocyanurates mentioned. These include many suitable ethylenic monomers among which may be mentioned the following: styrene, ring substituted alkyl styrenes such as o-, m-, and methylstyrene, 2,4-dimethylstyrene, 2,5-diethylstyrene, p-propyl styrene, etc., ring substituted halo styrenes, e.g., o-, m-, and p-chlorostyrene, 2-methyl-5-bromo styrene, etc., alpha substituted styrenes such as alpha methyl styrene, alpha chloro styrene and the like; esters of alpha-methylene aliphatic monocarboxylic acids, e.g., methacrylate, ethylacrylate, phenyl acrylate, methyl alpha-chloroacrylate, methylmethacrylate, ethylmethacrylate, etc.; acrylonitrile, methacrylonitrile; vinyl esters, e.g., vinyl acetate, vinyl propionate, vinyl laurate, etc; acrylamide and methacrylamide; allyl esters such as diallyl phthalate, allyl methacrylate, triallyltricarballylate, diallyl tetrachlorophthalate and the like.

In polyester resinous compositions, the ratio of reactive polyester resins to the monomeric cross-linking agent may be varied over a wide range. The unsaturated polyester content may, therefore, range from about 10 to about 90% of the total weight of the copolymerizable mixture. For the majority of purposes, however, particularly in the formulation of heat-resistant resins, the active polymerizable components comprise from about 40 to 60 parts by weight of the unsaturated polyester resin and correspondingly from about 60 to 40 parts of the monomeric cross-linking agent. The compounding of the various components of the polyester resins composition may be accomplished by merely mixing the unsaturated polyester with the monomeric material to form a homogenous mobile solution.

The copolymerization of the respective components of the polyester resinous composition is ordinarily facilitated by the use of a polymerization catalyst. Suitable polymerization catalysts include the organic superoxides, including the alcoholic and acidic peroxides. Among the preferred catalysts there are: the acidic peroxides e.g., benzoyl peroxide, phthalyl peroxide, acetyl peroxide, succinyl peroxide, benzoyl acetyl peroxide and the like; the alcohol peroxides, e.g., tertiary butyl hydroperoxide, cumene hydroperoxide, and terpene oxides. Also particularly exemplary of a super oxide type is methylethyl ketone peroxide. Still other polymerization catalysts may be used such as aluminum chloride, boron tri fluoride and azo type catalysts such as azodibutyronitrile.

Suitable concentrations of the catalyst employed are usually small, that is, from about 1 part catalyst per 100 parts of the polyester resinous compositions to about two parts per 100 parts of said composition.

Since the unsaturated polyesters made in accordance with this invention and especially the admixtures of the same with a monomeric cross-linking agent are susceptible to premature polymerization, even in the absence of a catalyst, it is often desirable to incorporate a polymerization inhibitor to insure that the resinous material will have a reasonable degree of shelf-life at room temperature. The polymerization inhibitors generally do not materially affect the polymerization mechanism once it is catalytic initiated. Suitable inhibitors for this purpose are well known in the art and include phenolic compounds especially the polynuclear phenols and various aromatic amines. The preferred inhibitor is represented by the compound hydroquinone. The concentration of the inhibitor is ordinarily less than about 1% based on the resinous composition. The preferable range for a material such as hydroquinone ranges from about 0.01 to about 0.1%. An inhibitor such as hydroquinone is advantageously present during the preparation of the unsaturated polyester, or it may optionally be added to the completed resin.

The polyester resinous compositions may be cured with or without pressure. As indicated, a polymerization catalyst is invariably employed. They may be cured at room temperature or as more customarily practiced, cured at elevated temperatures ranging up to about 130° C. Where the purpose is to prepare a heat-resistant polyester resinous composition, it is necessary to post-cure the material following initial curing under the conditions as aforesaid. Post-curing is conventionally practiced by heating the preliminarily cured copolymer to a temperature in the range between about 400° F. to 500° F. and holding at this elevated temperature for a period of from about 30 minutes to as long as 6 hours.

In order that those skilled in the art may better understand how the present invention may be practiced the following examples are given. These examples as set forth are primarily for the purpose of illustration and any specific enumeration of detail therein should not be interpreted as a limitation except where specified in the appended claims. All parts specified are parts by weight unless otherwise indicated.

*Example I*

Into a suitable reaction vessel equipped with an agitator, thermometer and condenser were charged 2490 parts of triallyl cyanurate, 798 parts of propylene glycol, 651 parts of ethylene glycol and 980 parts of maleic anhydride. This charge represented a molar ratio of 1:1 for the cyanurate ester and dibasic acid and an amount of polyol 5% in excess of the stoichiometric requirement. An inert atmosphere of nitrogen was provided over the surface of the reaction mixture. The reaction mixture was then heated with stirring to 170° C. at which time a vigorous reaction rate was indicated by a rapid accumulation of distillate consisting of water of esterification and allyl alcohol as the transesterification reaction by-product. When the reaction showed signs of moderating, the temperature was gradually raised to 195° C. and held at this temperature for 11 hours. The total distillate collected during the course of the reaction amounted to 1650 parts. The acid number of the final product was 116. The total amount of allyl alcohol corresponding to complete transesterification of the cyanurate ester in terms of the above-indicated charge is 1700 parts. Even taking in account the water of esterification corresponding to the acid number obtained, it can be seen that cyanurate ester charged had substantially completely reacted. The linearity of the resinous product was substantiated by observing its viscosity characteristics in the light of its acid number value.

The reactive polyester obtained was discharged into an open vessel and to which was added 0.03% hydroquinone and a quantity of triallyl cyanurate equal to the amount of solid resin yield.

A glass fiber reinforced laminate was prepared from the above polyester resinous composition catalyzed with 1.5% benzoyl peroxide in the following manner. A 181-136 type glass fiber cloth, corresponding to Specification MIL-F-9084, was cut into 18" by 19" pieces and laid up so that all plies were parallel. Twelve plies of the 181 glass cloth were used in order to obtain test panels having a thickness of 1/8". The lay-up was deposited on a large sheet of cellophane laid over a metal caul plate. The impregnating polyester resinous composition of this example was then poured onto the center of the cloth plies and spread out with a spatula. The cellophane was then folded over the lay-up assembly and a caul plate was placed on top. The resin was allowed to soak into the fabric for 15 minutes in order to accomplish thorough and uniform impregnation. After the soaking period the top caul plate was removed and the excess resin and trapped air were worked out by wiping the surface with a rigid flat piece of plastic. The laminate was consolidated in a press equipped with steam heated platens at a pressure of 50 p.s.i. for a period of 30 minutes. The temperature of the laminate during this curing stage was maintained at approximately 220° F. The resin content of the laminate so prepared was approximately 25%.

In order to obtain the necessary degree of heat-resistant properties of a laminate of this type, a preliminarily cured composite was then post cured for 6 hours at 500° F.

The suitability of the laminate prepared in accordance with this example for use in heat-resistant applications is indicated by the following test data.

Barcol hardness—63
Flexural strength at 23° C.—32,800 p.s.i.
Flexural modulus at 23° C.—2.4×10$^6$ p.s.i.
Flexural strength at 500° F. after 30 minutes at 500° F.—17,700 p.s.i.
Flexural modulus at 500° F. after 30 minutes at 500° F.—1.5×10$^6$ p.s.i.
Flexural strength at 500° F. after 200 hours at 500° F.—14,800 p.s.i.
Flexural modulus at 500° F. after 200 hours at 500° F.—1.3×10$^6$ p.s.i.

*Example II*

In this example substantially the same molar ratio of the reactive components were observed as employed in Example I. However, the primary objective in this embodiment is to illustrate the preparation of a reactive resin wherein only two of the allyloxy substituents associated with the triazine compound employed are reactively utilized.

Into a suitable vessel equipped as in Example I were charged 249 parts of triallyl cyanurate, 152 parts of propylene glycol, 98 parts of maleic anhydride and 0.01% hydroquinone based on the total charge of reactable components. This formulation minorly departs from that of Example I in that a stoichiometric relationship was observed for the components of the reaction mixture.

With an inert atmosphere of carbon dioxide maintained above the reaction mixture, heating with stirring was accomplished until the reaction temperature reached 175° C. After approximately 3 hours at this temperature the temperature was raised to 205° C. This reaction temperature was maintained for an additional 12 hours. At the completion of this time a total of 139 parts of distillate were collected. The acid number of the resin was 100. From this data it was determined that only two allyloxy groups of the cyanurate triester underwent reaction.

The solid reaction resin of this example was homogenously mixed with trimethallyl cyanurate in this ratio of resin to a monomer of 1:1, respectively. This polyester resinous composition was then catalyzed with 1% of benzoyl peroxide. The laminate was prepared and formed identical to the method employed in preparing the laminate specimen of Example I. The curing or sonsolidation cycle and the post cure operation conformed to the following schedule: one hour at 220° F., 1 hour at 300° F., 1 hour at 400° F., and 3 hours at 500° F. (a pressure of 50 p.s.i. applied continuously).

The laminate exhibited the following mechanical strength properties.

Flexural strength at 23° C.—57,400 p.s.i.
Flexural modulus at 23° C.—3.14×10$^6$ p.s.i.
Flexural strength at 500° F. after ½ hour at 500° F.—27,700 p.s.i.
Flexural modulus at 2.23×10$^6$ p.s.i.
Flexural strength at 500° F. after 24 hours—39,800 p.s.i.
Flexural modulus to —2.56×10$^6$
Flexural strength at 500° F. after 200 hours at 500° F.—28,800 p.s.i.
Flexural modulus to 1.78×10$^6$ p.s.i.

*Example III*

This example primarily illustrates the preparation of a saturated linear polyester resin suitable for use as a plasticizing resin for polyester resinous compositions or other types of thermosetting or thermoplastic resins.

Into a suitable reaction vessel equipped as in Example I were charged 386 parts of 1,3-diallyloxy, 5-propoxy triazine, 328 parts of diethylene glycol, 270 parts of diethyl succinate and 0.1% hydroquinone based on the total weight of the reaction mixture charge. The reaction mixture was heated to 190° C. and held at this temperature for 12 hours. The final product on cooling to room temperature exhibited slightly viscous characteristics but nevertheless was readily flowable. The product was used to plasticize a conventional polyester resinous composition which unplasticized exhibited particularly brittle properties. The amount of the resin of the example used as the plasticizer was 10% based on the combined weight of the unsaturated reaction resin at vinyl styrene monomer. One-eighth inch thick castings were prepared from the plasticized composition and it was noted that the plasticity characteristics of the casting attained were beneficially improved. Subjecting the plasticized casting to prolonged exposure at elevated temperature indicated relatively little volatization loss. This evaluation testing served to indicate that the plasticizing resin possessed adequate stability and was of suitable polymeric length.

*Example IV*

A reactive polyester resin was prepared corresponding identically in formulation and the manner of preparation as shown in Example II. The polyester was then dissolved in an equal weight of acetone to yield a 50% solution. This solution was then catalyzed with 1% methyl ethyl ketone peroxide based on the resin content and sprayed onto chopped glass fiber. The solvent was allowed to evaporate off and the resultant fiber and resin admixture was cured in a molding press to yield a molded specimen of approximately ¼" thickness and an area dimension of 5" by 3". The curing conditions were 500° F. for 15 minutes at 100 p.s.i. Following this curing process the glass fibers were observed to be firmly bonded together into a molded object. This product was found to be substantially insoluble in acetone indicating complete cure.

I claim:

1. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) a dicarboxylic acid, from about 1.25 to 3 mols of (B) a saturated aliphatic polyhydric alcohol and from about 0.25 to 2.0 mols of (C) a compound represented by the general formula:

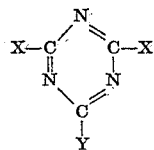

where X is an alkenyloxy radical containing not in excess of 4 carbon atoms and Y is selected from the group consisting of alkenyloxy, alkoxy, alkyl, aralkyl, aryl and amino radicals, wherein the mol equivalents of OH substituents contained by said (B) exceeds the mol equivalents of X substituents contained by said (C) by about 2.

2. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) an alpha, beta ethylenically unsaturated dicarboxylic acid, from about 1.25 to 3 mols of (B) a saturated aliphatic dihydric alcohol and from about 0.25 to 2.0 mols of (C) a compound represented by the general formula:

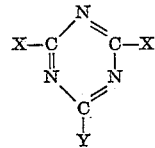

where X is an alkenyloxy radical containing not in excess of 4 carbon atoms and Y is selected from the group consisting of alkenyloxy, alkoxy, alkyl, aralkyl, aryl and amino radicals, wherein the mol equivalents of OH substituents contained by said (B) exceeds the mol equivalents of X substituents contained by said (C) by about 2.

3. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) a dicarboxylic acid, from about 1.25 to 3 mols of (B) a saturated aliphatic dihydric alcohol and from about 0.25 to 2.0 mols of (C) a tri-alkenyloxy 1,3,5-s-triazine, wherein the combined mol equivalents of carboxylic groups of said (A) and the alkenyloxy groups of said (C) exceeds the mol equivalents of OH substituents contained by said (B) by about 1.

4. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) an alpha, beta-ethylenically unsaturated dicarboxylic acid, from about 1.25 to 3 mols of (B) an alkane diol and from about 0.25 to 2.0 mols of (C) triallyl cyanurate, wherein the combined mol equivalents of carboxylic groups of said (A) and the allyloxy groups of said (C) exceeds the mol equivalents of OH substituents contained by said (B) by about 1.

5. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) an alpha, beta-ethylenically unsaturated dicarboxylic acid, from about 1.25 to 3 mols of (B) an alkane diol and from about 0.25 to 2.0 mols of (C) trimethallyl cyanurate, wherein the combined mol equivalents of carboxylic groups of said (A) and the methallyloxy groups of said (C) exceeds the OH substituents contained by said (B) by about 1.

6. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) maleic acid from about 1.25 to 3 mols of (B) an alkane diol and from about 0.25 to 2.0 mols of (C) triallyl cyanurate, wherein the combined mol equivalents of carboxylic groups of said (A) and the allyloxy groups of said (C) exceeds the OH substituents contained by said (B) by about 1.

7. A polymerizable resinous composition of matter comprising the product obtained by esterifying, at a temperature of not less than about 140° C. for a period of time sufficient to effect the transesterification of at least two of the alkenyloxy substituents on the triazine nucleus, 1 mol of (A) maleic acid, from about 1.25 to 3 mols of (B) an alkane diol and from about 0.25 to 2.0 mols of (C) trimethallyl cyanurate, wherein the combined mol equivalents of carboxylic groups of said (A) and the methallyloxy groups of said (C) exceeds the OH substituents contained by said B by about 1.

8. A resinous composition of matter comprising the product obtained by esterifying, at a temperature of not less than about 140° C. for a period of time sufficient to effect the transesterification of at least two of the alkenyloxy substituents on the triazine nucleus, 1 mol of (A) a non-polymerizable dicarboxylic acid, from about 0.25 to 2.0 mols of (B) a saturated aliphatic dihydric alcohol and from about 0.25 to 2.0 mols of (C) a compound represented by the general formula:

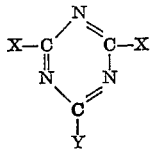

where X is an alkenyloxy radical containing not in excess of 4 carbon atoms and Y is selected from the group consisting of alkenyloxy, alkoxy, alkyl, aralkyl, aryl and amino radicals, wherein the mol equivalents of OH substituents contained by said (B) exceeds the mol equivalents of X substituents contained by said (C) by about 2.

9. A resinous composition of matter comprising the product obtained by esterifying, at a temperature of not less than about 140° C. for a period of time sufficient to effect the transesterification of at least two of the alkenyloxy substituents on the triazine nucleus, 1 mol of (A) succinic acid, from about 0.25 to 2.0 mols of (B) a saturated aliphatic dihydric alcohol and from about 0.25 to 2.0 mols of (C) a compound represented by the general formula:

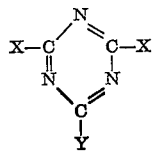

where X is an alkenyloxy radical containing not in excess of 4 carbon atoms and Y is selected from the group consisting of alkenyloxy, alkoxy, alkyl, aralkyl, aryl and amino radicals, wherein the mol equivalents of OH substituents contained by said (B) exceeds the mol equivalents of X substituents contained by said (C) by about 2.

10. A polymerizable resinous composition of matter comprising an admixture of 10 to 90 parts of the product according to claim 2 and correspondingly 90 to 10 parts of a monomeric material containing a $CH_2=C<$ group copolymerizable with said product.

11. A polymerizable resinous composition of matter comprising the admixture of 10 to 90 parts of the product according to claim 4 and correspondingly from about 90 to 10 parts of a monomeric material containing the $CH_2=C<$ group copolymerizable with said product.

12. A polymerizable resinous composition comprising the admixture of from about 10 to 90 parts of the product of claim 2 and correspondingly 90 to 10 parts of triallyl cyanurate.

13. A polymerizable resinous composition comprising the product of claim 6 and correspondingly from 90 to 10 parts of triallyl cyanurate.

14. A polymerizable resinous composition comprising the admixture of from about 10 to 90 parts of the product of claim 2 and correspondingly 90 to 10 parts of triallyl isocyanurate.

15. A polymerizable resinous composition comprising the product of claim 6 and correspondingly from 90 to 10 parts of triallyl isocyanurate.

16. The substantially infusible and insoluble product of polymerization of the composition according to claim 10.

17. The substantially infusible and insoluble product of polymerization of the composition according to claim 12.

18. The substantially infusible and insoluble product of polymerization of the composition according to claim 13.

19. The substantially infusible and insoluble product of polymerization of the composition according to claim 14.

20. The substantially infusible and insoluble product of polymerization of the composition according to claim 15.

References Cited in the file of this patent

UNITED STATES PATENTS 2,481,156     Schaefer     Sept. 6, 1949
2,557,667     Kropa     June 19, 1951